United States Patent [19]
Leeds

[11] 3,874,856
[45] Apr. 1, 1975

[54] POROUS COMPOSITE OF ABRASIVE PARTICLE IN A PYROLYTIC CARBON MATRIX AND THE METHOD OF MAKING IT

[75] Inventor: Donald H. Leeds, Rolling Hills, Calif.

[73] Assignee: Ducommun Incorporated, Los Angeles, Calif.

[22] Filed: Feb. 26, 1973

[21] Appl. No.: 336,029

Related U.S. Application Data

[63] Continuation-in-part of Ser. No. 9,917, Feb. 9, 1970, abandoned.

[52] U.S. Cl............... 51/296, 51/298, 51/301, 51/302, 51/303, 51/308
[51] Int. Cl......... B24d 3/10, B24d 3/18, B24d 3/32
[58] Field of Search ............ 51/298, 296, 309, 307, 51/306, 301, 302, 303, 308; 264/29

[56] References Cited
UNITED STATES PATENTS

| | | | |
|---|---|---|---|
| 2,342,121 | 2/1944 | Ciell.................................. | 51/308 |
| 2,475,565 | 7/1949 | Houchins........................... | 51/308 |
| 2,947,616 | 8/1960 | Coes et al.......................... | 51/296 |
| 3,003,860 | 10/1961 | Sermon et al...................... | 51/309 |
| 3,084,394 | 4/1963 | Bickerdike et al................. | 264/29 |
| 3,309,183 | 3/1967 | Sermon et al...................... | 51/306 |
| 3,321,327 | 5/1967 | Blanchard et al.................. | 264/29 |
| 3,321,727 | 5/1967 | Schrewelius....................... | 264/29 |
| 3,428,719 | 2/1969 | Robertson.......................... | 264/29 |
| 3,454,384 | 7/1969 | Kumagai............................. | 51/296 |

*Primary Examiner*—D. J. Arnold
*Attorney, Agent, or Firm*—Whann & McManigal

[57] ABSTRACT

A composite product and method of producing same, having abrasive or refractory particles held together by a binder in which the composite product is treated to form the binder into a porous skeletal network and subsequently expose to the presence of a carbonaceous gas at temperatures from approximately 1,900° to approximately 2,300°F., which at least partly replaces it with a pyrolytic carbon matrix, the product having porosity controlled by the amount of pyrolytic deposition.

10 Claims, 5 Drawing Figures

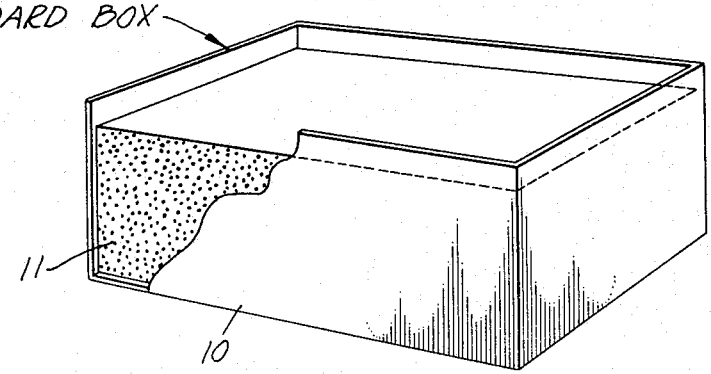
Fig. 1.
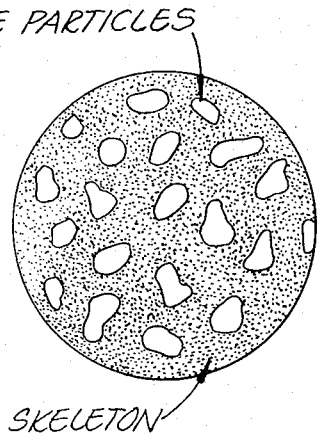
Fig. 2.
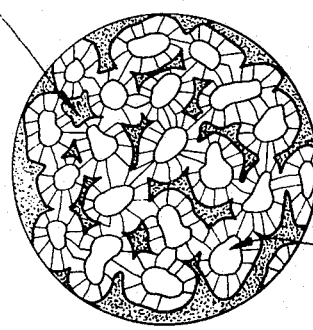
Fig. 3.
Fig. 4.

POROUS COMPOSITE OF ABRASIVE PARTICLE IN A PYROLYTIC CARBON MATRIX AND THE METHOD OF MAKING IT

This is a Continuation-in-part of Application Serial No. 9917, filed February 9, 1970 and now abandoned.

BACKGROUND OF INVENTION

My invention relates to method and apparatus for producing a composite product having a multiplicity of abrasive or refractory particles held together by a skeleton network and a pyrolytic carbon matrix, the product being porous, and the method of making the product being such that the degree of porosity can be controlled.

My invention is particularly useful in the field of grinding media and includes grinding wheels, sharpening stones, hones, dressing blocks, drills, cut-off wheels, blades, and self-sharpening equipment.

My invention is also useful in the aerospace and nuclear industries for the particulate and fibrous composites in heat shields, nose tips, and power plant areas where erosion resistance is important.

With reference to the grinding media industry, there are basically three types of grinding, the first of which is the standard type of grinding which is accomplished by abrasively scouring the work, tearing particles from the surface mechanically and losing heat by loss to worn particles at the grinding surface. The second type of grinding is a high-speed grinding, where high material removal rates are accomplished.

The third type of grinding includes electrically assisted grinding and electrochemical grinding in which current is passed through the wheel as a voltage is applied between the wheel and the work. It is postulated that, ideally, approximately 90% of this grinding is accomplished electrochemically and 10% by conventional grinding means. This type of grinding is currently addressed largely to steel and carbide materials.

The second and third types of grinding remove much more material per unit of time than the first type, and it becomes apparent that the low cost conventional grinding wheels used in the first type of grinding will not accomplish grinding of types two and three. Resinoid binders usually employed in wheels for the first type of grinding disintegrate during the heating of high speed grinding, thereby losing their hold on the grit or abrasive particles. Also, vitreous binders, which are also used in wheels for the first type of grinding, fail by thermal shock during the high speed grinding action, releasing the grit or abrasive particles.

In the third type of grinding the wheel must conduct electricity, which neither the normal vitreous nor the normal resinoid wheels can accomplish. There is a need in the industry for grinding wheels and other grinding media which will withstand high temperatures and have excellent heat dissipating qualities and will withstand thermal shock and also will conduct electricity.

SUMMARY OF INVENTION

It is an object of my invention to provide a method of making and a product in which the multiplicity of abrasive or refractory particles are held in form and position in the product and in which the supporting network is capable of withstanding high temperatures and of efficiently dissipating heat, is capable of withstanding thermal shock, and which will conduct electrically through the product, thus making it ideally suited for use in the second and third types of grinding.

It is an object of my invention to provide a grinding media which will withstand temperatures of 1,000°F. or higher and maintain shapes such as sharp edges and form shapes.

It is an object of my invention to provide a method of making a composite product in which the abrasive particles are first mixed with a suitable binder which will hold the abrasive in place during the carbonizing process and which will carbonize leaving a carbon skeletal network— or a skeletal network prior to the time the pyrolytic carbon matrix is being formed, with the result that the pyrolytic matrix replaces in part the original binder without the abrasive particles falling from their proper locations.

The carbon matrix which is formed by subjecting the carbonized green product to a temperature of between approximately 1,900°F. and approximately 2,300°F. is soft (yet possessing the necessary mechanical strength) and resilient in the face of thermal stress, and is capable of withstanding high temperatures and of conducting electricity. The particles are well bound in place and are thoroughly coated as well.

It is another object of my invention to provide a process and a product in which the abrasive particles or grains are tied into a common matrix, and in which there is considerable and adequate porosity to allow for wear which is a requisite to grinding. In the first or normal and the second or high speed grinding process the removal of a miniscule surface layer is the mechanism whereby energy dissipated at the surface in the form of heating is removed. If such heat were not removed the thermal expansion of the material would cause the outer diameter of the grinding wheel to grow and gouge into the work piece.

In the third or electrochemical grinding process, wet electrolyte is directed at the wheel, absorbed by the wheel and held in the pores. This electrolyte and the "heat sink" ability arising from good thermal conductivity of the wheels allows adequate cooling in this technology.

It is a further important object of my invention to provide a method of forming the product so that it will have adequate porosity and a method whereby the degree or percentage of porosity may be controlled.

It is an object of my invention to provide a method and product in which the binder which secures together the abrasive particles in the green stage can also consist of a binder which is burned away in the presence of an immature vitreous material, so that in the resultant product the matrix which holds the particles together comprises pyrolytic carbon, carbon skeletal network and vitreous material.

It is a further object of my invention to provide a method and product of the character described in which the binder which secures together the abrasive particles in the green stage is an inorganic binder which can be given adequate porosity by a drying out process which eliminates moisture and leaves spaces so that during the infiltration step the carbonaceous gas may flow freely through the porous body.

It is also an object of my invention to use cardboard or fiberboard as a casting mold. Cardboard or fiberboard is porous and will enhance adequate drying. Furthermore, on placing in an oven at 220°F. the cardboard becomes embrittled and is easily removed from the cast form.

DESCRIPTION OF DRAWINGS

Referring to the drawings:

FIG. 1 is a perspective view partially broken away showing the manner in which the green product may be cast in suitable form for drying and subsequent treatment;

FIG. 2 is a fragmentary view showing the manner in which the grinding media particles are surrounded by the pyrolyzed carbon skeleton subsequent to the pyrolyzation or partial burning out of the binder but prior to infiltration.

FIG. 3 is a fragmentary view showing the manner in which the grinding media particles are surrounded by the pyrolytic carbon matrix and the pyrolyzed carbon skeleton and in which the pores are relatively large;

FIG. 4 is a fragmentary and diagrammatic view similar to FIG. 3 showing a greater deposit of pyrolytic carbon with a resulting decrease in the size of the pores;

DESCRIPTION OF INVENTION AND PREFERRED EMBODIMENTS

Figure 5:
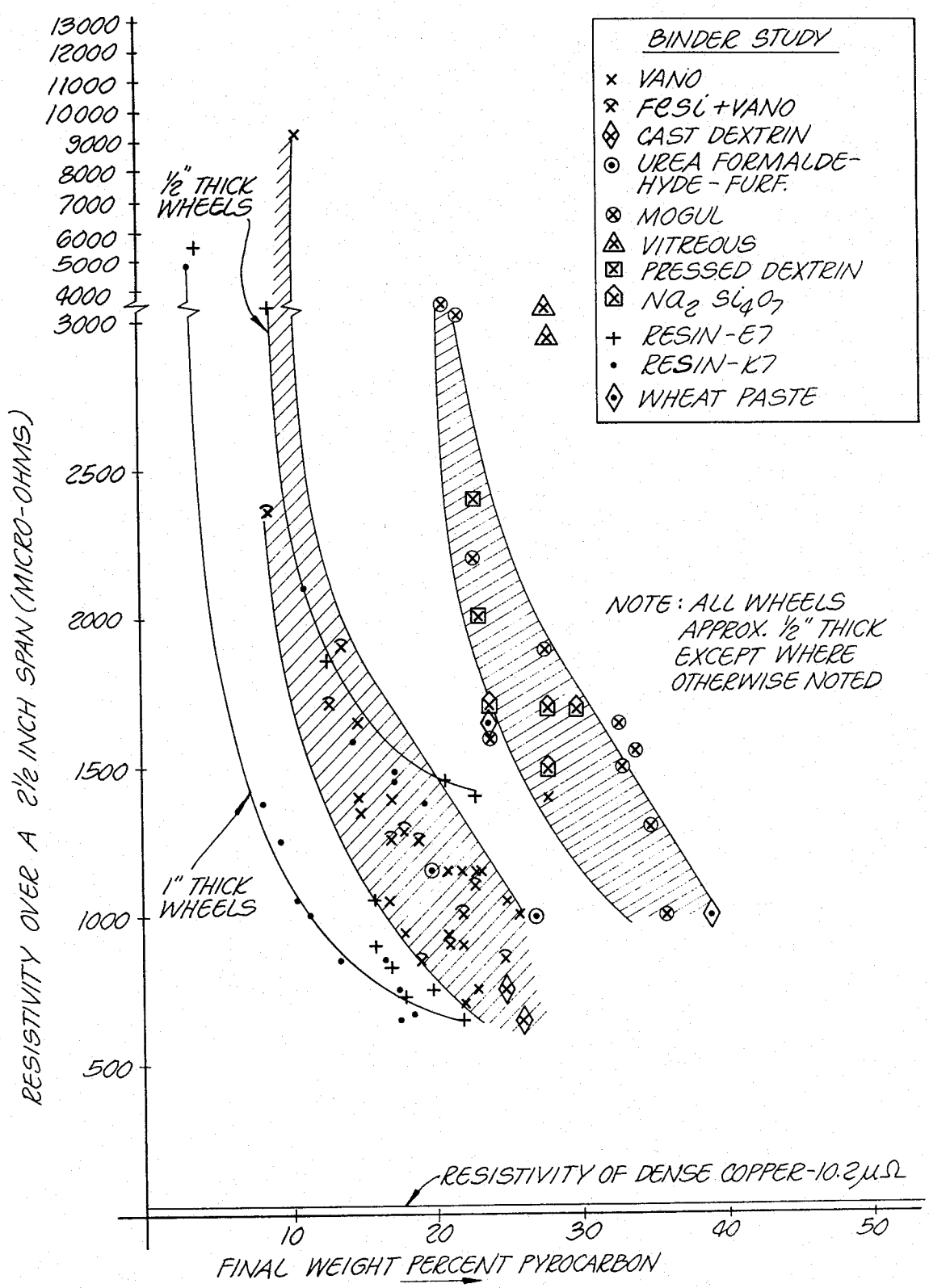
FIG. 5 is a graph showing electrical resistance with respect to pyrocarbon weight of the product.

In making the composite product of my invention the abrasive particles and binders are premixed either in a dry mix or a wet mix. The mixture is then cast into a suitable shape by pouring it into a form such, for example, as shown in FIG. 1, in which numeral 10 represents a cardboard box or form and the numeral 11 represents the green mixture, which has been poured thereinto. Such would be the shape of the product if it were used as a hone or grinding block, for example. If the product is to be a grinding wheel, the shape of the mold, of course, would be cylindrical. It is also likely that suitable shapes could be formed by an extrusion or by a pressing process. If pressure is necessary in the forming operation this could be applied very readily by a pressure plate or element not shown in the drawings.

The green product may be air dried at ambient or less than 200°F. temperature in order to develop strength without rupturing bonds developing in the early stages of drying. Satisfactory results have been obtained where the green product has been air dried at ambient temperature with and without special high humidity means for up to about 48 hours. The green product is then further dried until it is bone dry. This is satisfactorily accomplished by drying the green product in an oven for 1 to 72 hours at a temperature of between approximately 200° to 230°F., if a water medium is used, and approximately 75° to 200°F. if organic media such as acetone is used.

If the binder is inorganic, porosity may be provided by the removing of moisture in a drying out step. When the moisture has been removed the inorganic binder has openings or spaces through it which will give it adequate porosity.

If necessary or desirable, in order to cause the shape of the product to comply with shape specifications, rough machining may be done on the green product.

The next step to be performed is that of "burning out" or pyrolyzing, the organic binder into a carbon and/or inorganic skeleton which will hold the abrasive or refractory particles in position during the infiltrating and graphitizing steps. This is accomplished by raising the temperature of the green product to a suitable temperature for a sufficient period of time to accomplish the pyrolyzing to form the skeletal inorganic/carbon network. This usually occurs at a temperature in the neighborhood of 400° to 900°F.

FIG. 2, which is a fragmentary view, diagrammatically illustrates the manner in which the grinding media particles are surrounded by the pyrolized carbon material skeleton in order to hold the particles in position for the subsequent steps. It will be noted that the entire space between the abrasive particles is filled with this pyrolyzed skeleton and that it forms a highly porous structure.

This step has been quite satisfactorily performed by placing the green product in the furnace in which the product is to be pyrolyzed, infiltrated, and, in certain instances as will be pointed out, to be graphitized. Therefore, in performing the process the green product is placed in a suitable furnace for infiltrating with pyrolytic carbon in which furnace the temperature is raised over a period of from 1 hour to 5 hours, to a temperature (after first pyrolyzing the organic binder and forming the supportive inorganic/carbon network), at which carbonaceous gas such as methane will deposit an internal coating of pyrolytic carbon, or a coating of pyrolytic carbon and vitreous binder or a matrix of pyrolytic carbon and a nonvitreous binder.

The temperature and time during which the infiltrating step is performed is such that the product will be formed with a skeletal structure formed from the binder and a pyrolytic carbon internal coating or matrix, formed from the infiltrated carbonaceous gas, as will be more specifically described hereinafter.

It should be noted, however, that the temperature and time factor control the density of the product. As illustrated in FIG. 3, the pyrocarbon coating may be relatively thin with the result that the product has a high porosity. In FIG. 4 the product is shown where the infiltration or the pyrocarbon coating step is augmented and where the coating is thicker and the porosity of the product is accordingly reduced. Thus, it will be seen that by controlling the time factors and temperature factors (and pressure and gas mass flows) that the product may be of greater or less porosity and greater or less density as desired. Said results are obtained where the temperature range during infiltration is approximately 1,900°F. to approximately 2,300°F. and where the time factor varies between approximately 56 hours and approximately 120 hours. It is, of course, possible to change times and temperatures in order that the process may be performed to produce the product disclosed herein. However, with the teachings which are being given, those skilled in the art can make such changes in times and temperatures. The infiltration and heating step is continued for a sufficient period of time to create the desired pore size, quantity and distribution in the final product.

In certain instances it may be desirable to reduce the electrical resistivity of the product in order to reduce the temperature within the wheel or grinding stone, and this may be done by graphitizing all or a part of the matrix. One way in which this is done is to raise the temperature of the product to a graphitizing temperature which would be in the range of from approximately 4,532° to approximately 5,432°F. for a period of about 20 hours to about 1 hour, respectively. This, however, cannot be done with certain types of abrasives, for example, where the abrasive is aluminum oxide ($Al_2O_3$). An alternative and quite successful way of enabling graphitizing at a temperature well within safe ranges (2,372° to 3,092°F.) is to mix the abrasive or refractory particles with ferro silicon or other graphitization catalysts of which titanium, iron, and nickel are examples. Best results have been obtained where up to approximately 30% by weight of ferro silicon containing approximately 15 to 35% by weight of silicon in particle size of from approximately 25 to 125 microns are mixed with the abrasive or refractory particles. The product is then dried as previously explained, then it is raised to a temperature to pyrolyze the organic binder into a carbon skeleton. Following this the product is then heated and infiltrated as previously explained. Following this step the product is then heated to within a temperature range which will cause graphitization of the pyrolytic carbon binder. Good results are obtained by heating the product to approximately 2,372° to 3,092°F. for a period of time of from approximately 2 hours to approximately twenty hours.

The porosity may be varied as previously explained, to suit the requirements of a specific grinding material, and pore size may vary as a function of the material being ground. As an example, for steel grinding, less matrix, a finite size alumina particle, and more porosity, or more tooth is required than would be necessary for carbide grinding where more pyrolytic carbon matrix is required in order to yield a tougher grinding structure. The reverse situation could occur as a function of the desired downfeed rate and speed of a grinding wheel.

The abrasive particles may be any of those commonly used for abrasive wheels, stones, hones, or the like, and include alumina, silicon carbide, diamond, garnet, silica, ruby alumina, borolon alumina, fused alumina and may include more sophisticated oxides such as beryllia and ceramic hard metals such as nitrides and other carbides.

The size of the abrasive particles may vary in accordance with the requirements and are normally those commonly used in the grinding industry. For electrochemical grinding 100 mesh $Al_2O_3$ and SiC give satisfactory results for grinding steel and carbides where only a small fraction of the grinding is due to abrasion. For high speed grinding applications the size may be from approximately 2-mesh to approximately 600 mesh, either in single distributions or in mixtures.

The binders which may be used comprise glucose, dextrose, sucrose, maltose, which is more particularly described as carbohydrates including monosaccharides and disaccharides, starch, dextrin and gums which are described as polysaccharides, and mixtures such as dextrose and vitreous material, vitreous material being mixture of plastic clays, steatites and fluxes such as feldspars or superfluxes which include lead glass frit or other highly fluxed glass frits, such as phosphorous or boric oxide glass frits, which yield a suitable type inorganic oxide bond. Also ethyl silicate may be used which will form an inorganic vitreous bond. In some instances small amounts of wax emulsion is added for pressing mold release. Included in the carbohydrate binders described above as binder materials are solid and liquid commercial corn starches and liquid starches used in the clothing and processing industry. In certain instances walnut shells of various sizes such as 12 mesh or polystyrene particles, sawdust or similar burn-out material to control porosity have been added in order to obtain desired porosity and increase the matrice's ability to accept pyrocarbon binder.

Other organic binder materials which are found to be satisfactory are:

Karo Corn Syrup
Vano Liquid Starch
LePage Mucilage
DuPont Duco Cement
Kingsford Corn Starch
Den 438
Urea Formaldehyde Resin with Furfural Alcohol
Urea Formaldehyde Resin with 3% ammonium chloride
Epoxy and Phenolic Resins
Varcum No. 29-577
Goulac
Sunseal Wheat Paste
Furfural Alcohol
Mogul
Dextrin
Ligneous liquors
Albumen The organic binder must be of such a quality or nature that it will supply adequate "green strength" for handling, carbonize nondisruptively at the normal heating rate to achieve infiltration temperature, leave behind a skeletal structure or network which will retain the fabricated shape during infiltration, form this carbon skeletal structure about the particles such that it will lead infiltration gases to deposit carbon interstitially about the particles, and will yield esentially open porosity which will result in the interconnecting network of voids which make possible the engineering control of the infiltration process.

A satisfactory inorganic binder will retain the abrasive particles as they continuously fracture, giving a sharp surface to the work (mainly for high speed grinding), conduct heat away from the abrasive-particles so that the wheel will not expand and gouge the work (mainly for electrochemical grinding), but yet be thermal stress or shock resistant so as not to lose material by thermal spallation mechanisms (mainly high speed grinding), not deteriorate chemically at the high temperatures generated at high speeds by failing of the adhesive bond to the abrasive particles (mainly in high speed grinding). A satisfactory inorganic bond will allow for interconnected porosity to hold electrolyte/coolant and grinding debris (mainly in electrochemical grinding), allow dressing and truing operations without excessive cost or wear on dressing equipment after the inorganic bond is developed, and yield a high reliability predictably structured product.

Sodium silicate ($Na_2 Si_4 O_9$) has been successfully used as an inorganic binder. Other inorganic binders meeting the specified requirements may, of course, be used, such as phosphorous oxygen acids, aluminum and zirconium phosphates, calcium aluminates, plastic clays and finely ground oxide particles which may be used also as a filler with inorganic and also organic binders. Plastic clays may be used individually or in combination with mixtures of organic and inorganic vitreous oxide bond formers which comprise the combination of clays, steatites, feldspars and highly fluxed glass which eventually yield vitreous bonds in addition to the skeletal network. Other inorganics which might be used would include any two or more substances which could chemically combine to form a liquid substance capable of enveloping the abrasive particles and not block gas infiltration porosity.

Where an inorganic binder is used the inorganic material is mixed with the abrasive or refractory particles and liquid is added, if necessary, to form a slush. In the case of furfural alcohol it may be desired to add acetone to form the slush. The slush with abrasive or refractory particles are then cast together and placed in a suitable form, whereafter the drying out process as previously described is performed.

In the case of the inorganic binder the drying out process which removes moisture will ordinarily provide porosity in the binder body which is adequate to permit the flowing of carbonaceous gas through the binder product. Additional porosity may be provided during the heating process or, if desired, a porosity providing material could be added, such as referred to elsewhere in this application, which burn-out material will burn away to provide additional porosity.

In the infiltration step of the process, methane or propane or natural gas or other suitable carbonaceous gas or mixtures of carbonaceous gases may be used. The temperature at which the infiltrating is done is found to be highly satisfactory in the range of approximately 1,900°F. to approximately 2,300°F. The pressure maintained in the furnace during infiltration is from 1 to 765 mm Hg. Very good results are obtained in pressures between 10 to 50 mm Hg.

The infiltration time is from a minimum (gas on to gas off) of approximately 10 to 60 hours to a maximum of approximately 350 to 400 hours. The minimum infiltration time governs the maximum speed at which a grinding wheel may be rotated. In tests which were made it was found that a 56 hour constant infiltrated pressed 100 mesh alumina wheel will fail at 6,000 rpm in a spin test. This means that commercially such a wheel can only be rated at 4,000 rpm for maximum operating speed, which is two-thirds of the tested speed. This particular wheel would be acceptable for chemical grinding at lower speeds but unacceptable for high speed grinding.

The rate of flow of gas through the furnace has been successfully practiced at from 8 to 2,100 cubic feet per hour, depending on the furnace size and loading. In a 3-inch R&D furnace, which is a Pyco Vac electrical resistance furnace manufactured by Super Temp Company under license from General Electric, a gas flow of 8 to 10 cfh has proven satisfactory. For Super Temp Company built production furnaces the following flows have been found to be satisfactory: 3-foot furnace —40 cfh; 4-foot furnace —200 to 250 cfh; 7-foot furance —300 to 500 cfh; and 11-foot furnace —1,200 to 2,000 cfh flow of methane gas. The loading affects the flow rate used to a minor degree only. If a furnace is loaded too rigorously a sooting condition may result in the gas phase. In the practice of the process, a rich gas flow is used (2 to 6 times the methane gas needed) and, therefore, the loading effects are minor. If sooting occurs the pressure in the furnace is reduced.

In the practicing of the infiltration step better results are obtained where the gas is preheated, and air is excluded from the furnace.

FIG. 3 is a schematic view showing the product after the infiltration treatment, and shows a product which is of low density and high porosity. During infiltration the carbonaceous gas infiltrates the porous skeleton and carbon coating results. The majority of the infiltrated carbon adheres to each particle as a coating, as illustrated; this pyrocarbon coating consisting of the infiltrated carbon in combination with the carbon skeleton from the binder. The remaining portions of the skeletal structure are still quite porous; however, there is a minor coating of the infiltrated pyrolytic carbon on this porous portion of the skeleton.

Where the binder includes a vitreous material it may still be in particulate form until the infiltration step and infiltration temperatures are reached, at which time it then becomes mature and is in glass form. If the binder is the combination of an organic binder and vitreous material the organic binder will become carbonized, and form a carbon network; and the vitreous material will form a continuous glassy network in conjunction therewith.

FIGS. 3 and 4 show the network but do not indicate whether it is formed of an organic or inorganic material. Where the binder material is organic it will ordinarily form into carbon. Where it is formed from an inorganic material it will be continuous in character and no carbon will be formed.

The carbonaceous gas will deposit carbon both on the abrasive particles and on the network whether it be carbonaceous or glassy or vitreous or another inorganic product. Tests indicate that the greater deposit of the pyrocarbon matrix is formed around the abrasive or refractory particles, but these coatings are connected together as indicated in the drawings, leaving adequate porosity as previously described.

In FIG. 4 the infiltration has been carried on for a longer period of time with the result that the coating around each particle is made quite heavy and the product is, therefore, less porous.

The porosity of the finished product generally varies from less than one-fifth the particle size to larger than actual particle size. When 100 mesh particles are referred to I have reference to particles which have a distribution curve, the larger portion of which fall through a 100 mesh screen and remain on a 120 and 140 mesh screen. Perhaps 15% of the particles are larger than the 100 mesh U.S. Standard sieve and are retained on it. As the product becomes infiltrated, the porosity situation between particles changes since interstitial pores shrink as they become coated with pyrocarbon.

FIG. 3 represents the product in which the pores are quite large and may be said to be substantially the same as the particle size.

FIG. 4, however, shows a relatively thicker or heavier pyrolytic carbon network and the pore size has been reduced considerably.

It is to be understood, of course, that these drawings are diagrammatic only and that the pores are virtually all interconnected so as to give desired porosity throughout the entire product.

The density of the product of my invention varies from an initial density of 1.5–1.7 g/cc to a final density of 2.4–2.6 g/cc or more or less, depending upon infiltration time, pressure, mass flow of source gas, temperature and binders and particles used as well as conditions of the particular process performed (pulsed or constant flow infiltration for example).

The following are charts showing 27 examples of my process and product:

| SAMPLE NO. | ORIGINAL Weight | ORIGINAL Density g/cc | ORIGINAL Density #/ft³ | FINAL Weight | FINAL Density g/cc | FINAL Density #/ft³ | Weight % of Constituents of Finished Wheels/Blocks Inorg. Binders Vit. FC | Weight % Abrus. | Type Abrasive | Inorganic Binder | Type Organic Binder | Original w/o Organic Binder | Total Hrs. Infilt. | Flexure Strength at Room Temp. psi | Compressive Strength At Room Temp. psi | Maximum Speed in Spin Test (Wheels Only) R.P.M. |
|---|---|---|---|---|---|---|---|---|---|---|---|---|---|---|---|---|
| S-0 | 1168.5 | 1.728 | 107.80 | 1537.7 | 2.242 | 139.91 | 19 32 | 49 | SiC, 100 Grit | Vitreous | Dex | 5.0 | 120 | — | — | 6825 |
| S-1 | 1429.5 | 1.438 | 89.74 | 1672.2 | 2.265 | 141.34 | — 23 | 77 | Ruby, 100 Grit | — | Dex | 5.0 | 176 | — | — | 3400X |
| S-2 | 1488.4 | 1.516 | 94.62 | 1749.4 | 1.894 | 118.19 | — 23 | 77 | Al₂O₃, 100 Grit | — | Dex | 5.0 | 56 | — | — | — |
| S-3 | 1433.2 | 1.469 | 91.65 | 1691.2 | 1.821 | 113.66 | — 24 | 76 | Ruby, 100 Grit | — | Dex | 5.0 | 56 | — | — | 6000 (Failed) 3400X |
| S-4 | 1384.7 | 2.006 | 125.20 | 1718.9 | 2.455 | 153.18 | 20 25 | 55 | Al₂O₃, 100 Grit | Vitreous | Dex | 5.0 | 120 | — | — | — |
| S-5 | 1376.9 | 2.027 | 126.46 | 1714.2 | 2.452 | 153.00 | 20 28 | 52 | Al₂O₃, 100 Grit | Vitreous | Dex | 5.0 | 120 | — | — | 3400X |
| S-6 | 1378.9 | 2.046 | 127.65 | 1731.0 | 2.504 | 156.25 | 20 28 | 52 | Al₂O₃, 100 Grit | Vitreous | Dex | 5.0 | 120 | — | — | 3400X |
| 1-15 | 757.2 | 1.458 | 90.97 | 1134.0 | 2.223 | 138.74 | — 28 | 72 | SiC, 30-60 Mesh | — | Mogul | 2.0 | 488 | — | — | 7775 |
| 1-16 | 821.2 | 1.270 | 79.22 | 1286.0 | 2.116 | 132.06 | — 40 | 60 | SiC, 14 Mesh | — | Mogul W.Shells | 2.0 10.0 | 488 | — | — | — |
| 8-53 | 743.4 | 1.668 | 104.07 | 1043.9 | 2.249 | 140.36 | — 31 | 69 | SiC, 220 Mesh | — | Mogul | 3.5 | 120 | — | — | 8375 |
| 62 | 1006.0 | 1.558 | 97.22 | 1334.7 | 2.058 | 128.42 | — 30 | 70 | Al₂O₃, 100 Grit | — | Mogul | 7.0 | 120 | — | — | 3400X |
| 64 | 851.8 | 1.552 | 96.84 | 981.7 | 1.731 | 108.01 | — 18 | 82 | Al₂O₃, 100 Grit | — | Mogul | 7.0 | 120 | — | — | — |
| 66 | 1099.9 | 1.578 | 98.44 | 1527.5 | 2.581 | 161.02 | — 33 | 67 | Al₂O₃, 100 Grit | — | Mogul | 7.0 | 120 | — | — | 3400X |
| 67 | 1486.5 | 2.097 | 130.83 | 1882.5 | 2.121 | 132.32 | — 23 | 77 | Al₂O₃, 100 Grit | — | Vano | 5.5 | 120 | — | — | 3400X |
| V-1 | 203.4 | 1.834 | 114.43 | 239.0 | 2.123 | 132.48 | .42 15 | 85 | Al₂O₃, 100 Grit | Na₂Si₄O₉ | — | — | 120 | — | — | — |
| V-2 | 726.4 | 1.949 | 121.64 | 1015.1 | 2.516 | 156.98 | .35 29 | 71 | Al₂O₃, 100 Grit | Na₂Si₄O₉ | — | — | 110 | — | — | — |
| V-3 | 754.7 | 1.830 | 114.20 | 1081.2 | 2.588 | 161.49 | .34 31 | 69 | Al₂O₃, 100 Grit | Na₂Si₄O₉ | — | — | 110 | — | — | — |
| V-4 | 789.8 | 1.928 | 120.30 | 1093.8 | 2.505 | 156.31 | .36 28 | 72 | Al₂O₃, 100 Grit | Na₂Si₄O₉ | — | — | 110 | — | — | — |
| V-5 | 740.1 | 1.875 | 117.02 | 974.0 | 2.399 | 149.67 | .37 24 | 76 | Al₂O₃, 100 Grit | Na₂Si₄O₉ | — | — | 110 | — | — | — |
| 1 Block | 871.3 | 1.726 | 107.7 | —* | 2.308 | 144.01 | — 25** | 75 | SiC, 220 Mesh | — | Mogul | 3.5 | 639 | — | 21,900 | — |
| 2 Block | 870.9 | 1.520 | 94.89 | —* | 2.272 | 143.02 | — 34** | 66 | SiC, 65w/o 24m 35w/o 220m | — | Mogul | 3.5 | 639 | — | 23,467 | — |
| 3 Block | 860.9 | 1.507 | 90.02 | —* | 2.155 | 139.47 | — 30** | 70 | SiC, 14 Mesh | — | Mogul | 3.5 | 639 | 5210 | 24,200 | — |
| 4 Block | 901.5 | 1.026 | 64.01 | —* | 2.149 | 134.10 | — 52** | 48 | SiC, 65w/o 24m 35w/o 220m | — | Mogul W.Shells | 3.5 30.0 | 639 | 3988 | 24,267 | — |
| 6 Block | 865.9 | 1.706 | 106.5 | —* | 2.184 | 136.29 | — 22** | 78 | Fused Al₂O₃ 60 Grit | — | Mogul | 3.5 | 639 | 3358 | 16,667 | — |
| 9 Block | 866.3 | 1.424 | 83.86 | —* | 2.302 | 143.41 | — 38** | 62 | SiC, 30-60 Grit | — | Mogul | 3.5 | 639 | 4088 | 19,400 | — |
| 13 Block | 884.5 | 1.024 | 63.91 | —* | 2.015 | 125.74 | — 49** | 51 | SiC, 65w/o 24m 35w/o 220m | — | Mogul W.Shells | 3.5 50.0 | 639 | 3748 | 20,133 | — |
| 28 Block | 641.7 | 0.947 | 59.13 | —* | 1.993 | 124.36 | — 52** | 48 | SiC, 65w/o 24m 35w/o 220m | — | Mogul W.Shells | 3.5 30.0 | 639 | 5144 | 24,357 | — |

*Samples cut from block and infiltrated to final density after 398 hours of infiltration.
**Calculated from density difference initial to final.

XTested at Simonds El Monte facility.
This represents equipment maximum.

The following chart shows typical process variables for 120 and 56 hour pyrolytic carbon infiltration:

TYPICAL PROCESS VARIABLES FOR A 120 AND A 56 HOUR PYROCARBON INFILTRATION

| Operation Number | Time at Temperature Hrs. | Temperature °F | Pressure m m Hg | Flow Rate $N_2$ CFH | Flow Rate $H_2$ CFH | Flow Rate $CH_4$ CFH |
|---|---|---|---|---|---|---|
| 1 | — | Room Amb. | 0.15 | — | — | — |
| 2 | 16** | Rm —1450 | 1–3.7 | 3 v/o | — | — |
| 3 | 10 | 1450–1900 | 3.7–4.7 | 3 v/o | — | — |
| 4 | 0.5 | 1900 | 4.7–22.1 | — | 100 | — |
| 5 | 11 | 1900 | 27.7–13.8 | — | — | 75* |
| 6 | 7 | 1900 | 30–26 | — | — | 175 |
| 7 | 102 | 1900 | 30.9–28.1 | — | — | 225 |

GAS ON TO GAS OFF 120
Run No. 43-208

| 1 | — | Room Amb. | 0.27 | — | — | — |
|---|---|---|---|---|---|---|
| 2 | 10** | Rm —1900 | 0.5–1.4 | 5.15 v/o | — | — |
| 3 | 0.5 | 1900 | 1.1–14.8 | — | 100 | — |
| 4 | 7 | 1900 | 28.4–21.1 | — | — | 155 |
| 5 | 49 | 1900 | 28.4–29.9 | — | — | 225 |

GAS ON TO GAS OFF 56
Run No. 43-211

REMARKS
**Heat-UP Rate Was 5 KV For 3 Hrs., 10 KV For 3 Hrs., 15 KV For 3 Hrs.
*CH₄ was 225 CFH but was Reduced to 75 CFH Because of Unstable Pressure.

FIG. 5 is a graph which plots resistance measured over a 2½ inch span in micro-ohms v. pyrocarbon content in weight percentage.

The plot shows that certain of the green organic and inorganic binders used in the binder study result in higher resistance at a given pyrocarbon content than other binders. For example, wheels cast with dextrin as a green organic binder when infiltrated for 120 hours showed resistance values of 650 micro-ohms at a pyrocarbon content of 26 weight percent, whereas, pressed wheels containing a vitreous green binder initially when infiltrated for 120 hours showed a resistance of 3,000 micro-ohms for 28 weight per cent pyrocarbon. Although this shows the difference between an inorganic and an organic binder, we measured 22 weight percent pyrocarbon where we have wheels originally bound by Mogul in the green stage which also show 3,000 to 3,500 micro-ohms resistance.

In most recent data, shown at the right in FIG. 5, 1-inch thick wheels that were pressed on a production basis with a resin type binder shows that at 22 weight percent pyrocarbon we have 650 micro-ohms resistance. For electrochemical grinding purposes, as well as for thermal conduction heat transfer in cooling conventional wheels, the lower the resistance the better, especially from the standpoint of I²R heating in an electrical grinding application.

Therefore, the binders fall into three major categories, as shown by the plot—the Mogul-type green binder allows maximum pyrocarbon deposition at the end of 120 hours but the resistance is highest and the data scatter is greatest. The Vano Liquid Starch-type binders show an intermediate resistance range with an intermediate range data spread, and the 1-inch thick pressed resin bonded wheels show the lowest resistance and also the lowest data scatter.

I claim:

1. The method of making a porous composite product comprising the steps of:
    a. forming a green product comprising spaced abrasive particles and a metal graphitization catalyst held together by a binder;
    b. pyrolyzing said binder so as to form a skeletal network;
    c. maintaining said skeletal network in the presence of a carbonaceous gas, at a temperature of between approximately 1,900°F. and approximately 2,300°F. to form a pyrolytic carbon matrix to hold said particles in place in the porous composite product; and
    d. heat treating the product thus formed over the temperature range from 2,375°F. to 3,100°F. to graphitize said pyrolytic carbon matrix.

2. A method as defined in claim 1 in which said graphitization catalyst comprises ferro silicon containing 15 to 35 weight percent silicon in a particle size of 25 to 125 microns and in which said product is heat treated for from 2 to 20 hours to cause the pyrolytic carbon to graphitize and decrease electrical resistivity and increase thermal conductivity of the product.

3. A method as defined in claim 1 in which said abrasive particles are composed of alumina and silicon carbide particles in mesh sizes from approximately 2 mesh to approximately 600 mesh and comprising a weight percent from 48 to 85% of the constituents in the final composite product.

4. A method as defined in claim 1 in which said abrasive particles are selected from a group consisting of alumina, silicon carbide, diamond, garnet, silica, spinel, zircon, ruby alumina, boron alumina, fused alumina, cubic boron nitride, alumina-zirconia and aluminachromia compositions.

5. A method as defined in claim 1 in which said binder is an organic binder selected from a group consisting of urea formaldehyde, epoxy and phenolic resins, furfural alcohol, monosaccharides, disaccharides, starches, dextrin, ligneous liquors, ethyl silicates and albumen, and polysaccharides gums.

6. A method as defined in claim 5 in which said organic binder includes vitreous material.

7. A porous composite product comprising a multiplicity of spaced abrasive particles and a metal graphitization catalyst held together by a pyrolyzed binder and a coating of graphitized pyrolytic carbon which surrounds each particle.

8. A porous composite product as defined in claim 7 in which said abrasive particles are composed of alumina and silicon carbide particles comprising a composition from 48 to 85 weight percent and in which said graphitization catalyst is ferro silicon comprising a composition of up to 30 weight percent.

9. A porous composite product as defined in claim 7 in which said binder is inorganic.

10. A porous composite product as defined in claim 7 where said spaced abrasive particles are refractory particles.

* * * * *